United States Patent
Wu

(10) Patent No.: US 10,719,002 B2
(45) Date of Patent: Jul. 21, 2020

(54) PROJECTION DISPLAY DEVICE

(71) Applicant: Mega 1 Company Limited, New Taipei (TW)

(72) Inventor: Hang-Chiang Wu, New Taipei (TW)

(73) Assignee: Mega 1 Company Limited, New Taipei (TW)

( * ) Notice: Subject to any disclaimer, the term of this patent is extended or adjusted under 35 U.S.C. 154(b) by 0 days.

(21) Appl. No.: 16/360,146

(22) Filed: Mar. 21, 2019

(65) Prior Publication Data
US 2019/0369475 A1 Dec. 5, 2019

(30) Foreign Application Priority Data
Jun. 4, 2018 (TW) .............................. 107119232 A

(51) Int. Cl.
| | |
|---|---|
| *G03B 21/28* | (2006.01) |
| *H04N 9/31* | (2006.01) |
| *G03B 21/20* | (2006.01) |
| *G02B 26/12* | (2006.01) |
| *B60K 35/00* | (2006.01) |

(52) U.S. Cl.
CPC .......... *G03B 21/2066* (2013.01); *B60K 35/00* (2013.01); *G02B 26/12* (2013.01); *G03B 21/28* (2013.01); *H04N 9/3129* (2013.01); *H04N 9/3155* (2013.01); *B60K 2370/334* (2019.05)

(58) Field of Classification Search
CPC .. H04N 9/3129; H04N 9/3147; H04N 9/3132; H04N 9/3161; G03B 21/28; G03B 21/2033
USPC ....................................................... 353/34, 82
See application file for complete search history.

(56) References Cited

U.S. PATENT DOCUMENTS

| | | | |
|---|---|---|---|
| 2009/0141192 A1* | 6/2009 | Nojima ................ | H04N 9/3129 348/745 |
| 2015/0138511 A1* | 5/2015 | Domm ................. | G02B 27/106 353/31 |
| 2015/0260984 A1* | 9/2015 | Yamakawa .......... | H04N 9/3129 345/591 |

* cited by examiner

*Primary Examiner* — Ryan D Howard
(74) *Attorney, Agent, or Firm* — Laurence Kao; Opes IP Consulting Co. Ltd.

(57) ABSTRACT

A projection display device includes a light source module, a switch unit, and micro-scanning mirrors. The light source module provides a light beam. The switch unit receives the light beam and switches a transmission direction of the light beam to the corresponding one of the micro-scanning mirrors during each of periods. The micro-scanning mirrors cause the light beam to scan over projection surfaces to form images. The projection display device can project the images on the projection surfaces without image brightness loss.

10 Claims, 7 Drawing Sheets

PROJECTION DISPLAY DEVICE

BACKGROUND OF THE INVENTION

1. Field of the Invention

The invention relates to a projection display device and, more particularly, to a projection display device that can be applied to a vehicle.

2. Description of the Prior Art

A conventional projection display device applied to a vehicle usually only projects an image on a projection surface on a windshield of the vehicle, thereby generating a virtual image in front of the windshield to mainly provide information for a driver to see. Thus, a passenger or passengers in the vehicle cannot see the virtual image, or can see the virtual image but with unacceptable image quality. To improve this problem, an improved projection display device is developed by disposing a micro-structure such as a micro-lens array (MLA) on the projection surface on the windshield to increase the angle of view that can see the virtual image, so that the passenger or passengers in the vehicle can see the virtual image with acceptable image quality. However, the micro-structure will result in image brightness loss to reduce image quality.

SUMMARY OF THE INVENTION

The invention is adapted to provide a projection display device that can project images on projection surfaces without image brightness loss.

According to an aspect of the invention, there is provided a projection display device including a light source module, a switch unit, and micro-scanning mirrors. The light source module provides a light beam. The switch unit receives the light beam and switches a transmission direction of the light beam to the corresponding one of the micro-scanning mirrors during each of periods. The micro-scanning mirrors cause the light beam to scan over projection surfaces to for images.

According to another aspect of the invention, the micro-scanning mirrors include a first micro-scanning mirror and a second micro-scanning mirror; the periods include a first period and a second period; the projection surfaces include a first projection surface and a second projection surface; the images include a first image and a second image. The switch unit switches the transmission direction of the light beam to the first micro-scanning mirror during the first period, and the first micro-scanning mirror causes the light beam to scan over the first projection surface to form the first image. The switch unit switches the transmission direction of the light beam to the second micro-scanning mirror during the second period, and the second micro-scanning mirror causes the light beam to scan over the second projection surface to form the second image.

According to another aspect of the invention, the light source module includes light sources and an optical system. The light sources provides sub-light beam of different colors. The optical system receives the sub-light beams and mixes the sub-light beams to form the light beam.

According to another aspect of the invention, the switch unit includes a liquid-crystal (LC) lens.

According to another aspect of the invention, the projection surfaces are separate, adjacent, or interlaced.

According to another aspect of the invention, the projection display device is applied to a vehicle.

According to another aspect of the invention, the projection surfaces are located on a windshield or a roof of the vehicle.

According to another aspect of the invention, the projection surfaces are located on a windshield of the vehicle, or a roof of the vehicle, or both.

By the switch unit (e.g. the LC lens), during different periods (e.g. the first and the second periods), the transmission direction of the light beam is switched to different micro-scanning mirrors (e.g. the first and the second micro-scanning mirrors), and the light beam is directed to different projection surfaces (e.g. the first and the second projection surfaces) to scan to form different images (e.g. the first and the second images), so that it can project the images on the projection surfaces without image brightness loss.

The above and other objectives, features, and advantages of the invention will be better understood from the following detailed description of the preferred embodiments of the invention that are illustrated in the accompanying drawings.

DESCRIPTION OF THE PREFERRED EMBODIMENTS

Figure 1:
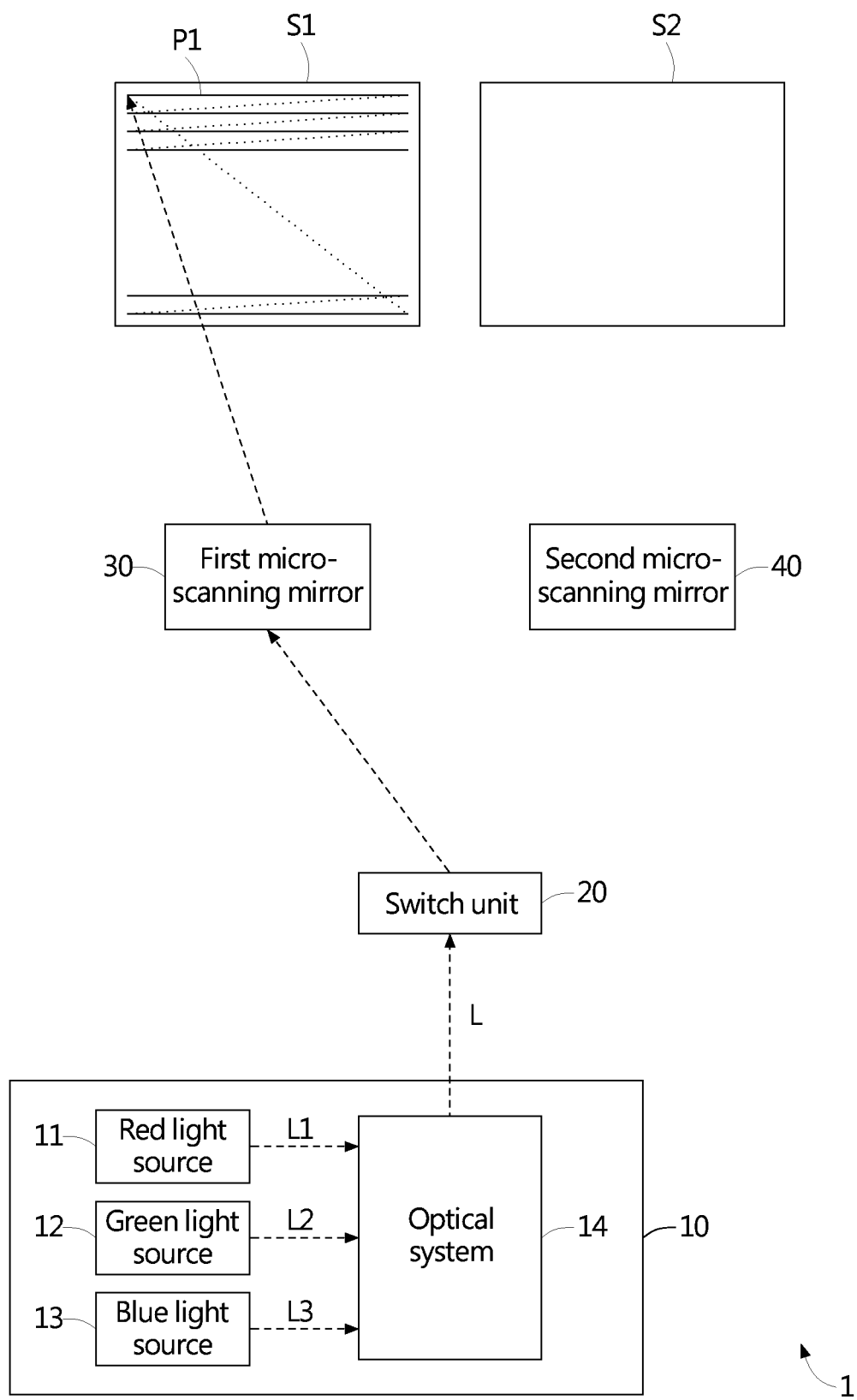
FIG. 1 is a schematic diagram of a projection display device scanning over a first projection surface during a first period according to an embodiment of the invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale or shape.

Figure 2:
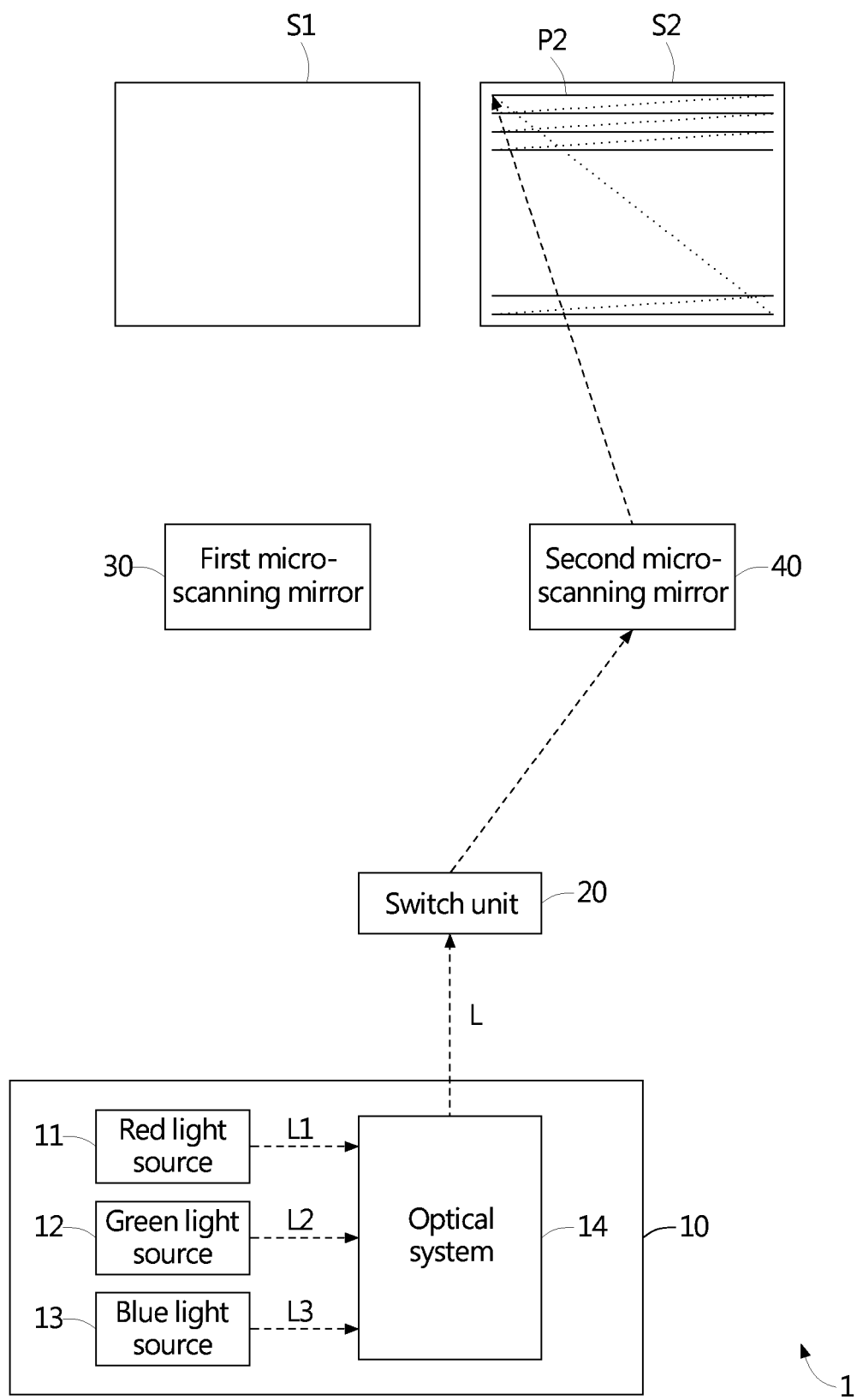
FIG. 2 is a schematic diagram of a projection display device scanning over a second projection surface during a second period according to an embodiment of the invention.

Referring to FIG. 1 and FIG. 2, FIG. 1 and FIG. 2 are schematic diagrams of a projection display device 1 scanning over two projection surfaces to form two images during two periods respectively according to an embodiment of the invention. The projection display device 1 includes a light source module 10, a switch unit 20, and micro-scanning mirrors. The light source module 10 provides a light beam L. The switch unit 20 receives the light beam L and switches a transmission direction of the light beam L to the corresponding one of the micro-scanning mirrors during each of periods. The micro-scanning mirrors cause the light beam L to scan over projection surfaces to form images.

In the embodiment, the micro-scanning mirrors include a first micro-scanning mirror 30 and a second micro-scanning mirror 40; the periods include a first period and a second period; the projection surfaces include a first projection surface S1 and a second projection surface S2; the images include a first image P1 and a second image P2. As shown in FIG. 1, the switch unit 20 switches the transmission direction of the light beam L to the first micro-scanning mirror 30 during the first period, and the first micro-scanning mirror 30 causes the light beam L to scan over the first projection surface S1 to form the first image P1. As shown in FIG. 2, the switch unit 20 switches the transmission direction of the light beam L to the second micro-scanning mirror 40 during the second period, and the second micro-scanning mirror 40 causes the light beam L to scan over the second projection surface S2 to form the second image P2. In an embodiment, the first period and the second period are very short, for example, each is $\frac{1}{120}$ second, so that human eyes may perceive that the first image P1 and the second image P2 are simultaneously displayed.

In the embodiment, the light source module 10 includes a red light source 11, a green light source 12, a blue light source 13, and an optical system 14. The red light source 11, the green light source 12, and the blue light source 13 provide a red sub-light beam L1, a green sub-light beam L2, and a blue sub-light beam L3 respectively. The optical system 14 receives the red sub-light beam L1, the green sub-light beam L2, and the blue sub-light beam L3, and mixes the red sub-light beam L1, the green sub-light beam L2, and the blue sub-light beam to form the light beam L. In an embodiment, according to an image input signal, the red light source 11, the green light source 12, and the blue light source 13 adjust light intensities of the red sub-light beam L1, the green sub-light beam L2, and the blue sub-light beam L3 respectively to form the light beam L, so that the first image P1 and the second image P2 formed by scanning the light beam L are color images. In an embodiment, the red light source 11, the green light source 12, and the blue light source 13 are laser diodes or light-emitting diodes (LEDs). However, the embodiment is not intended to limit the invention. For example, the light source module 10 can be changed to use a monochrome light source (e.g. a blue light source) to directly provide the light beam L, so that the first image P1 and the second image P2 formed by scanning the light beam L are monochrome images or grayscale images.

In the embodiment, the switch unit 20 includes a liquid-crystal (LC) lens. The LC lens can change the operating voltage to change the orientation of liquid crystals to provide different refraction effects, thereby switching the transmission direction of the light beam L to the first micro-scanning mirror 30 during the first period (as shown in FIG. 1) and to the second micro-scanning mirror 40 during the second period (as shown in FIG. 2). The first micro-scanning mirror 30 and the second micro-scanning mirror 40 include scanning mirrors using micro-electro-mechanical systems (MEMS) technology, referred to as MEMS mirrors. The MEMS mirror has dual-axis vector scanning and can direct (e.g. in a reflection manner) the light beam to scan over the projection surface to form a two-dimensional image.

Figure 3:
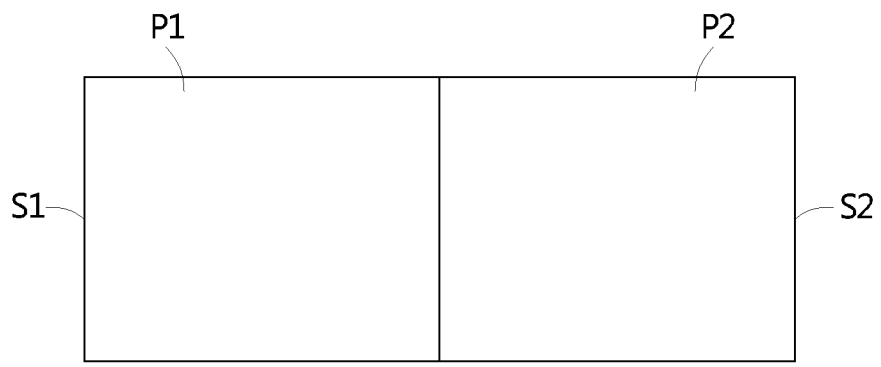
FIG. 3 is a schematic diagram showing the first projection surface and the second projection surface are adjacent in a left-to-right arrangement according to an embodiment of the invention.

In the embodiment, the first projection surface S1 and the second projection surface S2 are separate. Correspondingly, the first image P1 and the second image P2 are separate. The first image P1 and the second image P2 can provide the same information, or different information. In addition, the first projection surface S1 and the second projection surface S2 (or the first image P1 and the second image P2) can have the same size and shape, or different sizes or shapes. Referring to FIG. 3, FIG. 3 is a schematic diagram showing the first projection surface S1 and the second projection surface S2 are adjacent in a left-to-right arrangement according to an embodiment of the invention. Correspondingly, the first image P1 and the second image P2 are adjacent in a left-to-right arrangement. The first image P1 and the second image P2 can provide the same information, or different information. If the first image P1 and the second image P2 provide different information, the first image P1 and the second image P2 can be combined into a complete image to provide complete information. However, the embodiment is not intended to limit the invention. For example, the first projection surface S1 and the second projection surface S2 can be changed to be adjacent in an up-to-down arrangement.

Figure 4:
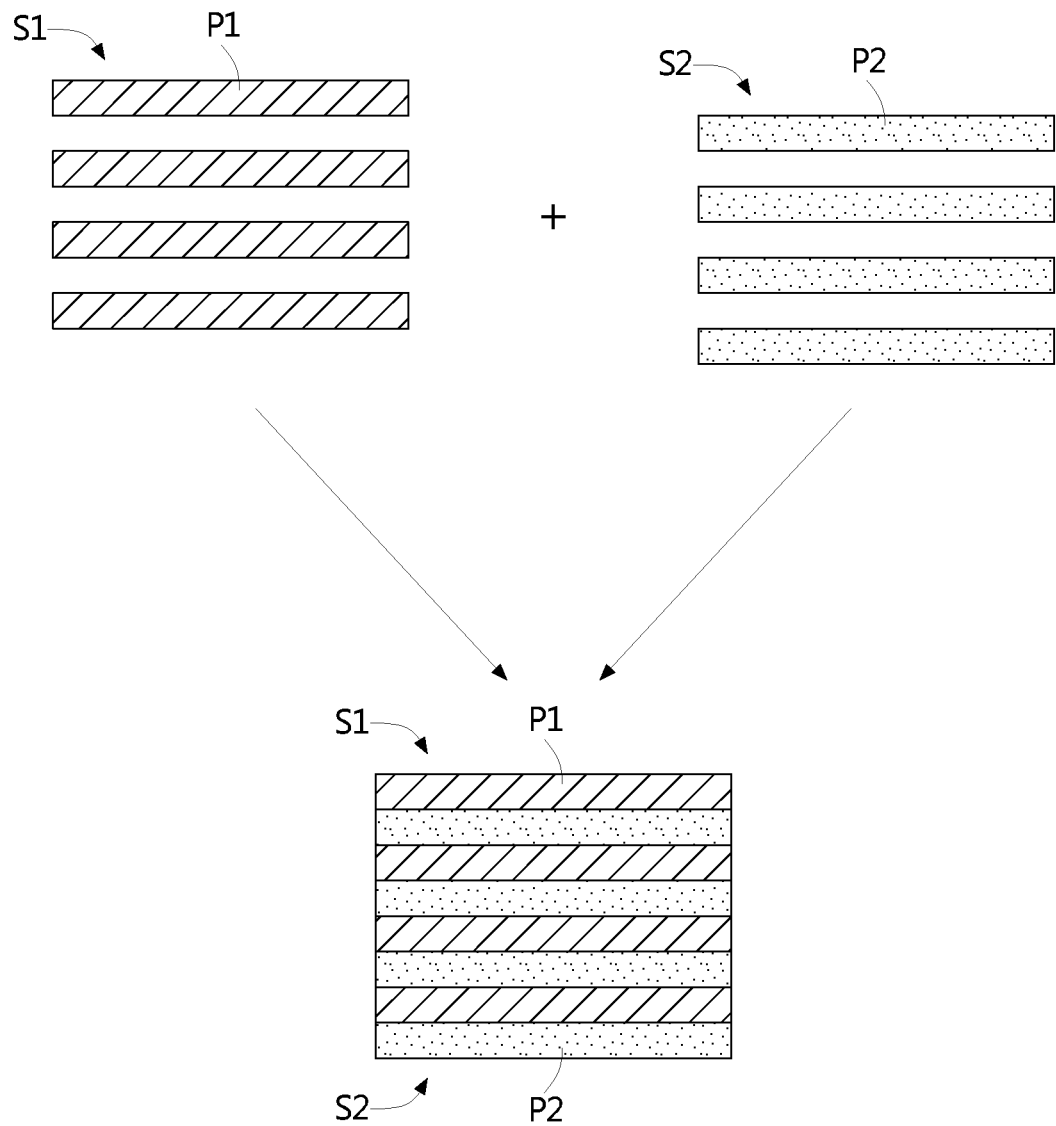
FIG. 4 is a schematic diagram showing the first projection surface and the second projection surface are interlaced according to an embodiment of the invention.

Referring to FIG. 4, FIG. 4 is a schematic diagram showing the first projection surface S1 and the second projection surface S2 are interlaced according to an embodiment of the invention. Correspondingly, the first image P1 and the second image P2 are interlaced. The first image P1 and the second image P2 are usually combined into a complete image to provide complete information. In an embodiment, information provided by the first image P1 is odd-line information of the complete information, and information provided by the second image P2 is even-line information of the complete information.

In an embodiment, the projection display device 1 is applied to a vehicle. The first micro-scanning mirror 30 (or the second micro-scanning mirror 40) can direct the light beam L to scan over the first projection surface S1 (or the second projection surface S2) on a windshield of the vehicle to form the first image P1 (or the second image P2), in which the first image P1 (or the second image P2) is a virtual image in front of the windshield. In addition, the first micro-scanning mirror 30 (or the second micro-scanning mirror 40) can direct the light beam L to scan over the first projection surface S1 (or the second projection surface S2) on a roof of the vehicle to form the first image P1 (or the second image P2), in which the first image P1 (or the second image P2) is a real image on the inner surface of the roof and can provide the driver or the passenger to adjust the seat to lie down and see. In an embodiment, the first projection surface S1 and the second projection surface S2 are separate and located on the windshield of the vehicle, and the first image P1 and the second image P2 projected thereon are respectively provided for the driver and the passenger to see. In another embodiment, the first projection surface S1 and the second projection surface S2 are separate and respectively located on the windshield and the roof of the vehicle, and the first image P1 and the second image P2 projected thereon are respectively provided for the driver and the passenger to see, in which the passenger needs to adjust the seat to lie down and see.

Figure 5:
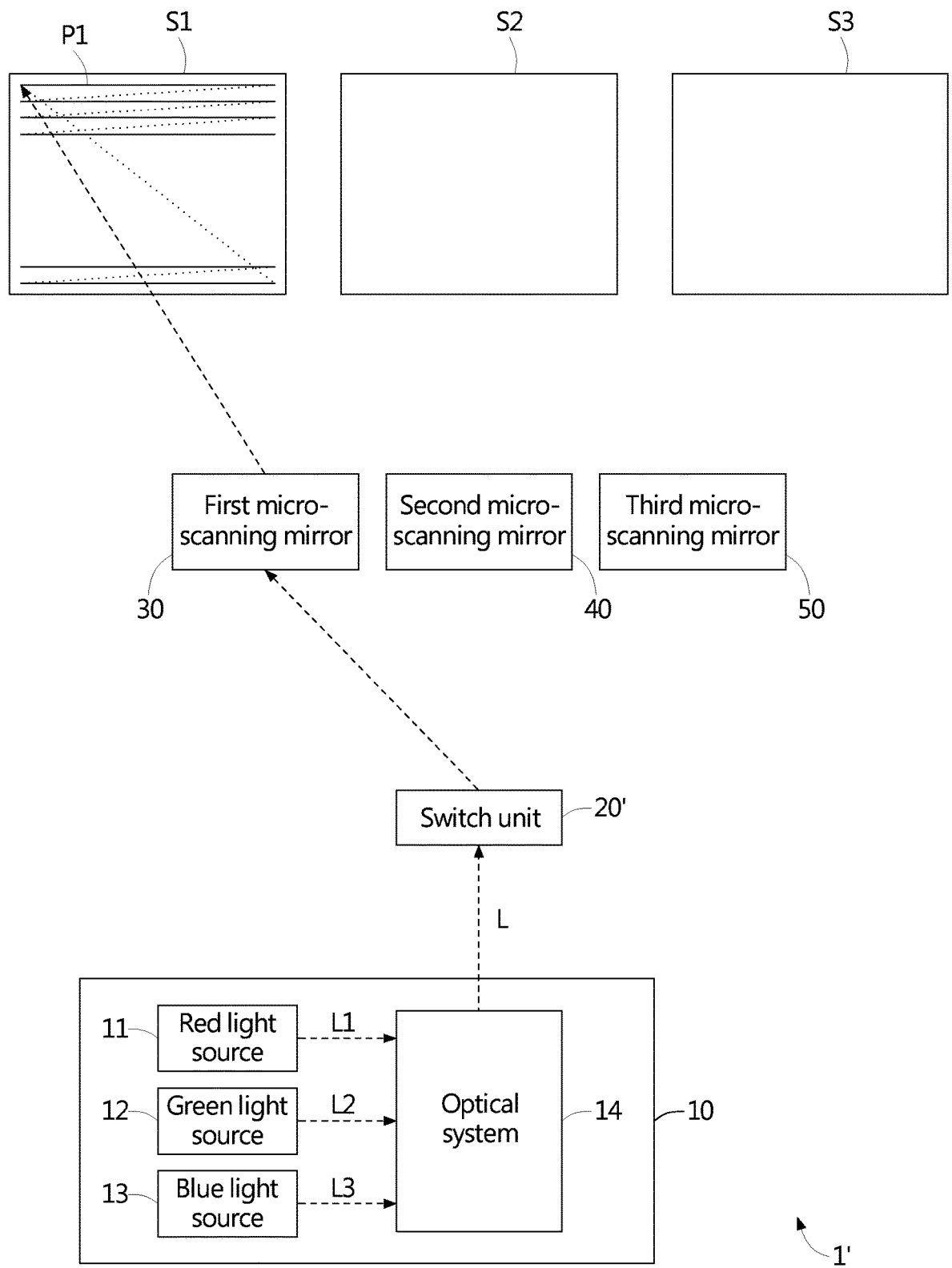
FIG. 5 is a schematic diagram of a projection display device scanning over a first projection surface during a first period according to another embodiment of the invention.
Figure 6:
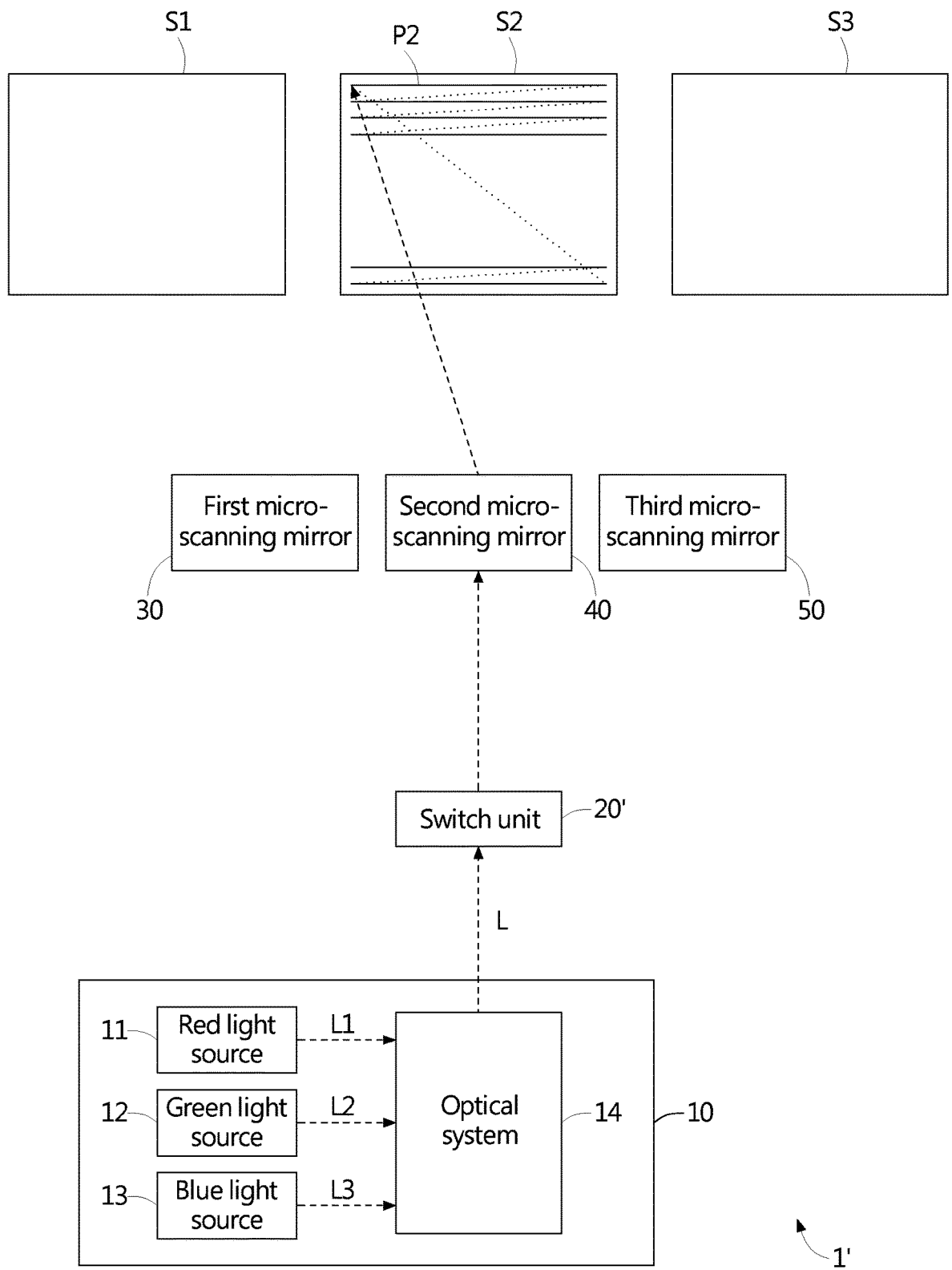
FIG. 6 is a schematic diagram of a projection display device scanning over a second projection surface during a second period according to another embodiment of the invention.
Figure 7:
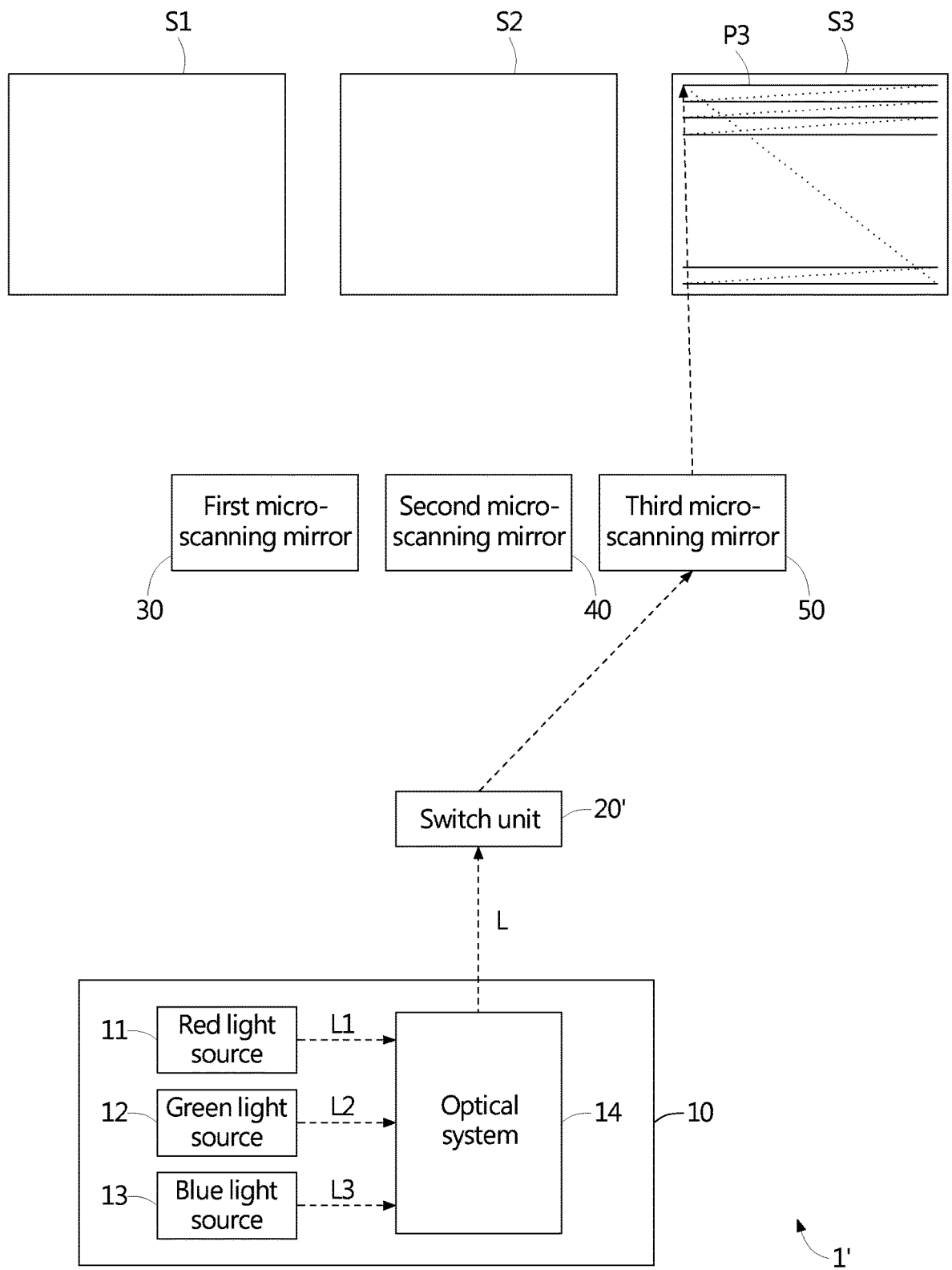
FIG. 7 is a schematic diagram of a projection display device scanning over a third projection surface during a third period according to another embodiment of the invention.

Referring to FIG. 5 to FIG. 7, FIG. 5 to FIG. 7 are schematic diagrams of a projection display device 1' scanning over three projection surfaces to form three images during three periods respectively according to another embodiment of the invention. The projection display device 1' includes a light source module 10, a switch unit 20', and micro-scanning mirrors. The light source module 10 provides a light beam L. The switch unit 20' receives the light beam L and switches a transmission direction of the light beam L to the corresponding one of the micro-scanning mirrors during each of periods. The micro-scanning mirrors cause the light beam L to scan over projection surfaces to form images.

In the embodiment, the micro-scanning mirrors include a first micro-scanning mirror 30, a second micro-scanning mirror 40, and a third micro-scanning mirror 50; the periods include a first period, a second period, and a third period; the projection surfaces include a first projection surface S1, a second projection surface S2, and a third projection surface S3; the images include a first image P1, a second image P2, and a third image P3. As shown in FIG. 5, the switch unit 20' switches the transmission direction of the light beam L to the first micro-scanning mirror 30 during the first period, and the first micro-scanning mirror 30 causes the light beam L to scan over the first projection surface S1 to form the first image P1. As shown in FIG. 6, the switch unit 20' switches the transmission direction of the light beam L to the second micro-scanning mirror 40 during the second period, and the second micro-scanning mirror 40 causes the light beam L to scan over the second projection surface S2 to form the second image P2. As shown in FIG. 7, the switch unit 20' switches the transmission direction of the light beam L to the third micro-scanning mirror 50 during the third period, and the third micro-scanning mirror 50 causes the light beam L to scan over the third projection surface S3 to form the third image P3. In an embodiment, the first period, the second period, and the third period are very short, for example, each is 1/180 second, so that human eyes may perceive that the first image P1, the second image P2, and the third image P3 are simultaneously displayed.

In summary, by the switch unit (e.g. the LC lens), during different periods, the transmission direction of the light beam is switched to different micro-scanning mirrors, and the light beam is directed to different projection surfaces to scan to form different images, so that it can project the images on the projection surfaces without image brightness loss.

Although the invention has been described in terms of the preferred embodiments, it is not limited thereto. It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A projection display device comprising a light source module, a switch unit, and a plurality of micro-scanning mirrors, with the light source module providing a light beam, with the switch unit receiving the light beam and switching a transmission direction of the light beam to the corresponding one of the plurality of micro-scanning mirrors during each of a plurality of periods, with the plurality of micro-scanning mirrors causing the light beam to scan over a plurality of projection surfaces to form a plurality of images, wherein the light source module includes a plurality of light sources and an optical system, with the plurality of light sources providing a plurality of sub-light beam of different colors; with the optical system receiving the plurality of sub-light beams and mixing the plurality of sub-light beams to form the light beam.

2. The projection display device of claim 1, wherein the plurality of micro-scanning mirrors comprise a first micro-scanning mirror and a second micro-scanning mirror; with the plurality of periods comprising a first period and a second period, with the plurality of projection surfaces comprising a first projection surface and a second projection surface, with the plurality of images comprising a first image and a second image; with the switch unit switching the transmission direction of the light beam to the first micro-scanning mirror during the first period, with the first micro-scanning mirror causing the light beam to scan over the first projection surface to form the first image; with the switch unit switching the transmission direction of the light beam to the second micro-scanning mirror during the second period, with the second micro-scanning mirror causing the light beam to scan over the second projection surface to form the second image.

3. The projection display device of claim 1, wherein the plurality of projection surfaces are separate, adjacent, or interlaced.

4. The projection display device of claim 1, wherein the projection display device is applied to a vehicle.

5. The projection display device of claim 4, wherein the plurality of projection surfaces are located on a windshield of the vehicle, or a roof of the vehicle, or both.

6. A projection display device comprising a light source module, a switch unit, and a plurality of micro-scanning mirrors, with the light source module providing a light beam, with the switch unit receiving the light beam and switching a transmission direction of the light beam to the corresponding one of the plurality of micro-scanning mirrors during each of a plurality of periods, with the plurality of micro-scanning mirrors causing the light beam to scan over a plurality of projection surfaces to form a plurality of images, wherein the switch unit includes a liquid-crystal lens.

7. The projection display device of claim 6, wherein the plurality of micro-scanning mirrors comprise a first micro-scanning mirror and a second micro-scanning mirror; with the plurality of periods comprising a first period and a second period, with the plurality of projection surfaces comprising a first projection surface and a second projection surface, with the plurality of images comprising a first image and a second image; with the switch unit switching the transmission direction of the light beam to the first micro-scanning mirror during the first period, with the first micro-scanning mirror causing the light beam to scan over the first projection surface to form the first image; with the switch unit switching the transmission direction of the light beam to the second micro-scanning mirror during the second period, with the second micro-scanning mirror causing the light beam to scan over the second projection surface to form the second image.

8. The projection display device of claim 6, wherein the plurality of projection surfaces are separate, adjacent, or interlaced.

9. The projection display device of claim 6, wherein the projection display device is applied to a vehicle.

10. The projection display device of claim 9, wherein the plurality of projection surfaces are located on a windshield of the vehicle, or a roof of the vehicle, or both.

* * * * *